Figure 1:
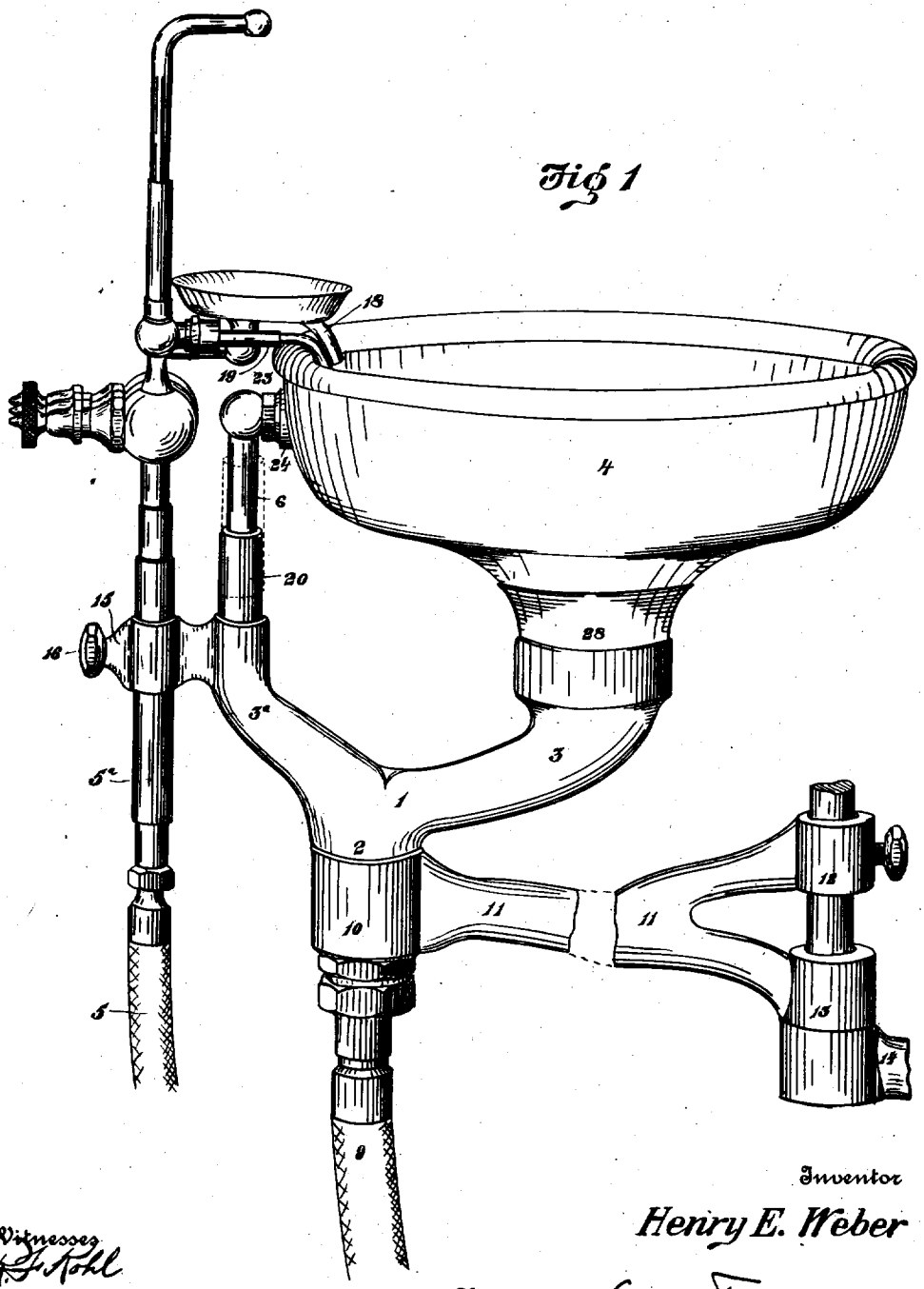

H. E. WEBER.

CUSPIDOR.

APPLICATION FILED AUG. 12, 1911.

Reissued Mar. 19, 1912.

13,388.

3 SHEETS—SHEET 1.

Witnesses
R. F. Kohl
Ruth C. Miller

Inventor
Henry E. Weber

By Harry Grease
Attorney

H. E. WEBER.
CUSPIDOR.
APPLICATION FILED AUG. 12, 1911.
Reissued Mar. 19, 1912.
13,388.
3 SHEETS—SHEET 2.
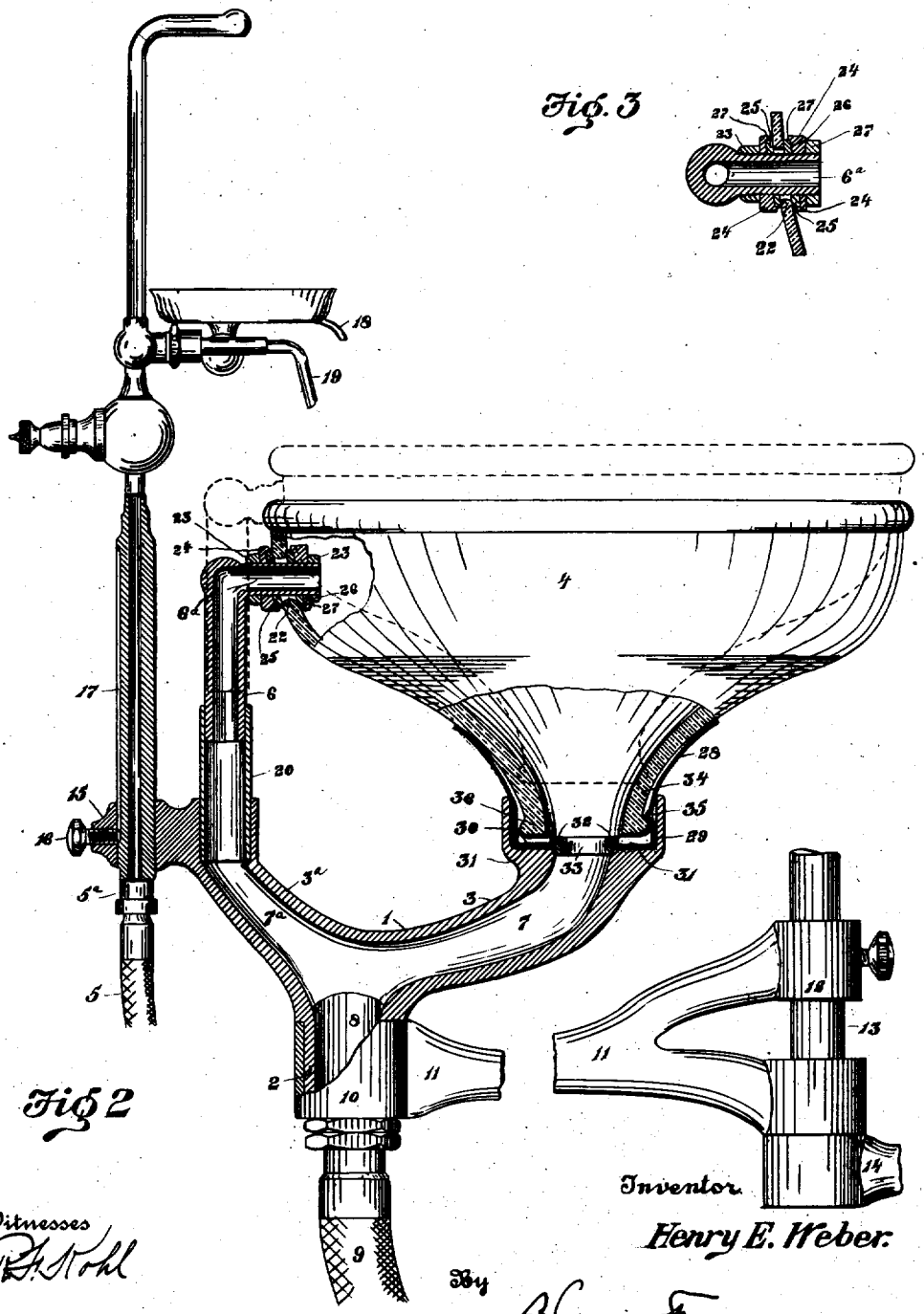
COLUMBIA PLANOGRAPH CO., WASHINGTON, D. C.

H. E. WEBER.

CUSPIDOR.

APPLICATION FILED AUG. 12, 1911.

Reissued Mar. 19, 1912.

13,388.

3 SHEETS—SHEET 3.

Witnesses

R. Wohl

Ruth A. Miller

Inventor

Henry E. Weber.

Harry Grease

Attorney

COLUMBIA PLANOGRAPH CO., WASHINGTON, D. C.

UNITED STATES PATENT OFFICE.

HENRY E. WEBER, OF CANTON, OHIO, ASSIGNOR TO THE WEBER DENTAL MANUFACTURING COMPANY, OF CANTON, OHIO, A CORPORATION OF OHIO.

CUSPIDOR.

13,388. Specification of Reissued Letters Patent. Reissued Mar. 19, 1912.

Original No. 970,148, dated September 13, 1910, Serial No. 509,488. Application for reissue filed August 12, 1911. Serial No. 643,803.

*To all whom it may concern:*

Be it known that I, HENRY E. WEBER, a citizen of the United States, residing at Canton, in the county of Stark and State of Ohio, have invented a new and useful Improvement in Cuspidors, of which the following is a specification.

The invention relates to a cuspidor adapted to be secured and supported, with the usual supply, waste and overflow pipes, on a bracket on the side of a dental or other chair. In cuspidors of this type, it is desirable to arrange the cuspidor and its several pipes so that the same can be gyrated on an independent axis in addition to being swung on the supporting bracket to various positions at the side of the chair, and it is also desirable that the cuspidor parts shall be well balanced on the axis of gyration so there will be no binding of the parts when rotated. These objects are attained by providing a Y-shaped cuspidor bracket which is swiveled by its stem on the ordinary swinging or supporting bracket, and by securing or mounting the cuspidor bowl on one branch of the Y bracket and the supply pipe on the other branch thereof. In such cuspidors the bowl-flusher and saliva-ejector pipes are usually extended from the outer side over the rim of the bowl and thence downward therein, and the overflow pipe is usually connected to the side wall of the bowl, which arrangement and connection of these pipes renders it difficult to rotate the bowl on or to detach and remove it from its bracket support. These difficulties are overcome by providing a vertical guide-bearing on the cuspidor bracket, in which a slide section of the supply pipe is adapted to be secured and adjusted endwise, whereby the flusher and ejector pipes can be elevated above the bowl, which permits the same to be freely detached and removed; and by connecting the overflow pipe with the overflow channel in the bracket by a free telescoping tube, so that this connection can be severed either by sliding the tube upward on the pipe or by lifting the pipe directly out of the tube.

The cuspidor bowls are usually made of glass, porcelain or other hard inflexible material, and it is difficult to properly connect the overflow pipe in the aperture therefor which is provided in the side wall of the cuspidor, and especially so from the fact that the shape of the side wall is varied in different types and patterns of bowls. This difficulty is obviated by providing wedge-shaped washers on the overflow pipe which are adapted to be clamped against the wall of the bowl whether the same is truly cylindric or is flared upward or downward. And finally, it is difficult to connect the bowl on its supporting bracket, which is usually made of cast iron or other hard inflexible material, without shaping or grinding the connected parts to neatly fit each other or employing some form of packing to make a tight joint which will not tend to break the brittle body of the cuspidor. This difficulty is overcome by providing an intervening collar made of sheet metal or other flexible and preferably elastic material, the lower end of which is suitably secured to the bracket and the upper end of which is flared in the form of an inverted bell and adapted to receive and support on its upper rim the similarly shaped neck of the bowl, whereby the flexibility of the collar permits its edge to neatly fit the neck of the bowl; and by providing an external annular rib on the end of the neck of the bowl and a series of inward protrusions in the flexible collar which are adapted to be sprung over and to clamp the rib on the end of the bowl neck.

The various features of the invention, thus set forth in general terms, are illustrated with respect to a preferred embodiment of the same in the accompanying drawings, forming part hereof, in which—

Figure 4:
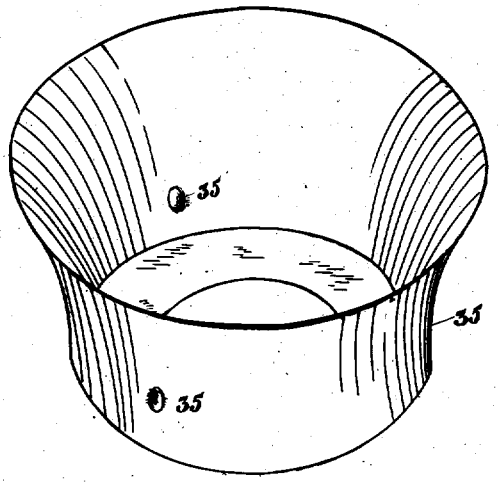
Figure 5:
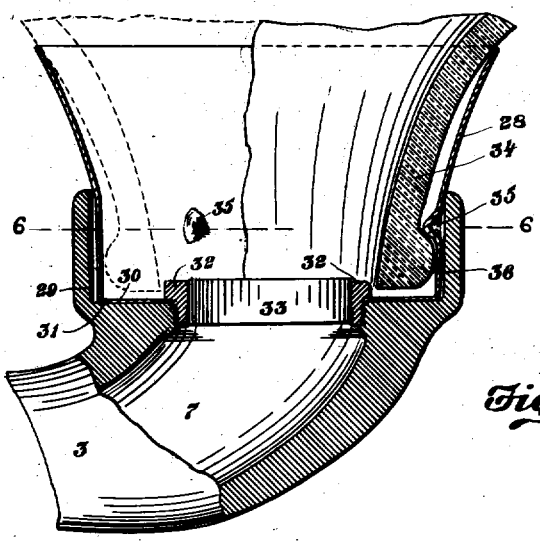
Figure 6:
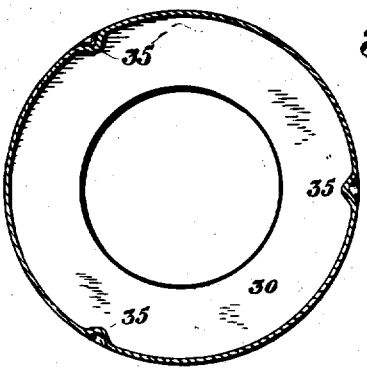

Figure 1 is a perspective view of the improved cuspidor; Fig. 2, an elevation of the same with some parts in section to show details; Fig. 3, a fragmentary section showing the overflow washers applied to a bowl having cylindric side walls; Fig. 4, a detached perspective view of the flexible collar; Fig. 5, an elevation section of the collar showing the preferred method of clamping the bowl neck therein and of securing the collar to the cuspidor bracket; and Fig. 6, a transverse section of the flexible collar on line 6—6, Fig. 5.

Similar numerals refer to similar parts throughout the drawings.

The cuspidor bracket 1 is formed with the stem 2 and two diametrically diverging branches 3 and 3ª, preferably extending upward in the general form of a Y; on one of which branches the cuspidor bowl 4 is secured and to the other of which branches the supply pipe 5 and the overflow pipe 6 are respectively secured and connected. The waste channel 7 and the overflow channel 7[a] are provided for drainage in the respective branches of the bracket and merge to form the outlet channel 8 in the stem thereof, which outlet channel in turn leads to the waste pipe 9 which is connected to the stem of the bracket.

The stem of the cuspidor bracket is swiveled in the free-end bearing 10 of the supporting bracket 11, the other end 12 of which bracket is pivotally mounted on the pintle 13 which is suitably secured to the chair, not shown, as by means of the arm 14. And the cuspidor bracket is so proportioned and arranged, with respect to the cuspidor parts, that the same will be well balanced on the axis of the bracket, and the cuspidor parts are thus free to gyrate without in any manner binding the swiveled connection of the cuspidor bracket with the supporting bracket; which gyration in addition to the swinging of the supporting bracket on its pintle, permits the cuspidor parts to be readily positioned in any desired relation with respect to each other and to the chair.

The guide-bearing 15 is formed or attached on the overflow branch of the cuspidor bracket, in which bearing the slide section 5[a] of the supply pipe is adapted to be secured and to be adjusted endwise, as by means of the set screw 16 operating through the bearing and into the longitudinal channel 17 provided in the side of the supply pipe section. This connection and arrangement of the supply pipe permits the same to be adjusted downward and upward to bring the discharge ends of the bowl-flusher pipe 18 and the saliva-ejector pipe 19 into proper operative position inside the bowl, as shown in Fig. 1, or to elevate them freely above the bowl as shown in Fig. 2. And by turning the set screw out of the pipe-section channel, it is evident that when the flusher and ejector pipes are raised above the rim of the bowl, the supply pipe can be rotated in its bearing as may be desired.

The overflow pipe 6 which depends from the side wall of the cuspidor bowl, communicates with the overflow channel in the cuspidor bracket by means of the intervening tube 20, which telescopes in the cylindric countersink 21 formed in the bracket, and also around the lower end of the overflow pipe. It is evident that by merely raising this tube out of the bracket countersink, as shown by broken lines in Fig. 1, the cuspidor bowl is free to be rotated on its central support; and also that when the cuspidor bowl is raised from its bracket support, the overflow pipe can be lifted freely out of the tube, as shown by broken lines in Fig. 2.

The overflow pipe is connected to the side wall of the bowl by means of the inturned upper end 6[a] which extends through the overflow aperture 22 which is provided in the wall. This end of the pipe is provided with threads on which the nuts 23 are adapted to operate, one being located inside and the other outside the wall. Intervening between the nuts and each side of the wall are provided the washers 24 and preferably also the resilient packing rings 25. The body of each washer is made thicker on one side than the other, with the beveled or inclined inner face 26 presented toward the wall of the bowl, and the peripheral flange 27 is preferably provided around the same face which serves to hold the packing ring in place. When the parts are assembled, the washers and packing rings are clamped against the sides of the bowl wall, thus making a water-tight and secure joint therewith.

It is evident that by the use of the wedge-shaped washers, the overflow pipe connection can be adapted to bowl walls of different shapes. For instance, when the wall is flared upward and outward, as shown in Figs. 1 and 2, the outer washer is arranged with its thinner edge upward and its thicker edge downward, while the inner washer is reversely arranged; which relative arrangement of the outer and inner washer is reversed in case of a side wall which flares downward and outward. And if the connection is made with a cylindric wall, the washers are arranged with the thin edge on one side and the thicker edge on the other, as shown in Fig. 3, which arrangement of course deflects the upper end of the outlet pipe slightly out of a radial line, but this deflection is so light and unimportant as to be negligible.

The cuspidor bowl 4 is secured on the branch 3 of the cuspidor bracket by means of the intervening connecting collar 28 made of sheet metal or other similar flexible and elastic material. The connecting collar is preferably secured in the socket 29 formed around the outlet channel in the bracket by means of the inturned annular flange 30 on the lower end of the collar which is adapted to rest on the corresponding annular shoulder 31 forming the bottom of the socket, and to be clamped in proper position by the external annular flange 32 of the screw collar 33 which is turned into the opening of the outlet channel. The lower end of the collar is preferably made in the form of a cylinder, whence the upper end portion is flared upward and outward in the form of an inverted bell to receive the similarly shaped neck 34 of the bowl. A series of preferably three inward protrusions 35 are provided around the cylindric lower end portion of the collar, preferably adjacent to the angle of the flared upper end portion thereof, which protrusions are conveniently made by inwardly indenting the collar, as shown.

The neck 34 of the cuspidor is flared upward and outward in such a manner that when it is inserted in the connecting collar, the bowl will come in contact with and rest upon the upper rim of the collar before the lower end of the neck comes in contact with the inturned flange of the collar, and the lower portion of the cuspidor neck is formed less in diameter than the collar, so that it does not contact with the wall of the same below the upper rim portion thereof. The annular rib 36 is provided around the lower end of the cuspidor neck, the middle portion of which rib is formed larger in diameter than the diameter of the protrusions in the collar, but slightly less than the adjacent wall of the collar, from which middle portion the upper and lower sides of the rib are beveled or inclined inward; and the parts are so arranged that when the cuspidor neck is inserted in the collar, the annular rib will first force the protrusions on the collar outward until the same have passed over the wider middle portion of the rib, which is permitted by an annular distortion or flattening of the lower end of the collar between the protrusions; after which the protrusions will contract inward on the upper inclined side of the rib, against which they are clamped by the elasticity of the collar, when the neck of the bowl impinges the rim of the collar. It is evident that by this construction and arrangement, the rim portion of the collar quite readily conforms and adapts itself to the exact shape of the impinging portion of the cuspidor neck, against which the rim portion of the collar is clamped by the action of the protrusions in its lower end on the inclined upper side of the neck rib; and also that while the bowl is normally held securely in position, it can be readily removed from the collar by merely lifting it out of the same with sufficient force to again deflect the protrusions to pass over the wider middle portion of the rib.

I claim:

1. A support, a bracket having an axial stem and two diverging branches, the stem being swiveled in the support, a cuspidor bowl mounted on one branch and a supply pipe secured to and an outlet pipe communicating with the other branch, there being waste and overflow channels in the branches and an outlet channel in the stem of the cuspidor bracket.

2. A support, a bracket having an axial stem and two diametrically diverging branches, the stem being swiveled in the support, a cuspidor bowl mounted on one branch and an outlet pipe communicating with the other branch, there being waste and overflow channels in the branches and an outlet channel in the stem of the cuspidor bracket.

3. A support, a bracket having an axial stem and two branches diametrically diverging upward, the stem being swiveled in the support, a cuspidor bowl mounted on one branch and a supply pipe secured to the other branch, there being a waste channel in the one branch of the cuspidor bracket.

4. A bracket, a cuspidor bowl mounted thereon, a vertical bearing on the bracket adjacent to the bowl, and a supply pipe having a slide section secured in the bearing and a discharge end normally extending over the rim of the bowl, the slide section being endwise-adjustable in the bearing downward to bring the discharge end in operative position and upward to elevate the discharge end freely above the bowl.

5. A bracket provided with an overflow channel having a countersink in its opening, a bowl mounted on the bracket and having an overflow pipe depending from the bowl and a tube telescoped in the countersink and on the lower end of the pipe and adapted to slide upward on the pipe out of the countersink.

6. A cuspidor bowl provided with an aperture in its wall, a pipe extended through the aperture and having adjustable nuts thereon inside and outside the wall, and washers with inclined faces and rim flanges and intervening packing rings between the nuts and the wall.

7. A bracket, an elastic collar having an inturned flange on its inner end secured to the bracket and having its upper end flared outward, there being an annular series of inward protrusions on the collar adjacent to its lower end, and a bowl having a flared neck on its lower side adapted to rest on the rim portion only of the flared end of the collar, there being an annular rib around the end of the neck adapted to be clamped on its upper side by the protrusions when the bowl rests on the collar.

8. A bracket, an elastic collar secured by its lower end to the bracket and having its upper end flared outward, there being an annular series of inward protrusions in the collar adjacent to its lower end, and a bowl having a flared neck on its lower side adapted to impinge the flared end of the collar, there being an annular rib around the end of the neck adapted to be clamped on its upper side by the protrusions when the bowl impinges the collar.

9. A connection between a bracket and a bowl having a flared neck on its under side comprising an elastic collar connected to the bracket and adapted to receive the bowl neck, there being an annular rib around the end of the neck, and inward protrusions around the lower portion of the collar adapted to engage the rib to clamp the bowl neck in the collar.

10. A bracket, a flexible collar secured to the bracket and having its upper end flared outward, and a bowl having a flared neck on its lower side adapted to rest on the rim portion only of the flared end of the collar.

11. A swinging support, a Y-shaped cuspidor bracket having its stem swiveled in the free end of the swinging support and its two branches diverging upward, a cuspidor bowl mounted on one branch and a supply pipe secured to and an outlet pipe communicating with the other branch, there being drainage channels in the branches and an outlet channel in the stem of the cuspidor bracket.

12. A swinging support, a Y-shaped cuspidor bracket having its stem swiveled in the free end of the swinging support and its two branches diverging upward, a cuspidor bowl mounted on one branch and an outlet pipe communicating with the other branch, there being drainage channels in the branches and an outlet channel in the stem of the cuspidor bracket.

13. A swinging support, a Y-shaped cuspidor bracket having its stem swiveled in the free end of the swinging support and its two branches diverging upward, a cuspidor bowl mounted on one branch and a supply pipe secured to the other branch, there being a drainage channel in the one branch of the cuspidor bracket.

14. A support, a Y-shaped bracket having its stem swiveled in the support and its two branches diverging upward, a cuspidor bowl mounted on one branch and a supply pipe secured to and an outlet pipe communicating with the other branch, there being drainage channels in the branches and an outlet channel in the stem of the bracket.

15. A support, a Y-shaped bracket having its stem swiveled in the support and its two branches diverging upward, a cuspidor bowl mounted on one branch and an outlet pipe communicating with the other branch, there being drainage channels in the branches and an outlet channel in the stem of the bracket.

16. A support, a Y-shaped bracket having its stem swiveled in the support and its two branches diverging upward, a cuspidor bowl mounted on one branch and a supply pipe secured to the other branch, there being a drainage channel in the one branch of the cuspidor.

17. A swinging support, a cuspidor bracket having a stem and two branches diametrically diverging upward, the stem being swiveled in the free end of the swinging support, a cuspidor bowl mounted on one branch and a supply pipe secured to the other branch of the cuspidor bracket.

18. A support, a bracket having an axial stem and two branches diametrically diverging upward, the stem being swiveled in the support, a cuspidor bowl mounted on one branch and a supply pipe secured to the other branch.

19. A swinging support, a Y-shaped cuspidor bracket having its stem swiveled in the free end of the swinging support and its two branches diverging upward, a cuspidor bowl mounted on one branch and a supply pipe secured to the other branch of the cuspidor bracket.

20. A support, a Y-shaped bracket having its stem swiveled in the support and its two branches diverging upward, a cuspidor bowl mounted on one branch and a supply pipe secured to the other branch of the bracket.

HENRY E. WEBER.

Witnesses:
RUTH A. MILLER,
RAY F. KOHL.

Copies of this patent may be obtained for five cents each, by addressing the "Commissioner of Patents, Washington, D. C."